United States Patent
Yano

(10) Patent No.: US 8,364,493 B2
(45) Date of Patent: Jan. 29, 2013

(54) SPOKEN DIALOGUE SPEECH RECOGNITION USING ESTIMATED NUMBER OF RETRIEVED DATA AS COST

(75) Inventor: Takehide Yano, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 991 days.

(21) Appl. No.: 12/401,640

(22) Filed: Mar. 11, 2009

(65) Prior Publication Data

US 2009/0234650 A1    Sep. 17, 2009

(30) Foreign Application Priority Data

Mar. 11, 2008   (JP) ................................. 2008-061458

(51) Int. Cl.
*G10L 15/22* (2006.01)
(52) U.S. Cl. .................. 704/275; 704/251; 704/270
(58) Field of Classification Search .................. 704/251, 704/270, 275
See application file for complete search history.

(56) References Cited

U.S. PATENT DOCUMENTS

| | | | |
|---|---|---|---|
| 6,513,037 B1 * | 1/2003 | Ruber et al. | 1/1 |
| 6,934,675 B2 * | 8/2005 | Glinski et al. | 704/9 |
| 7,366,668 B1 * | 4/2008 | Franz et al. | 704/252 |
| 7,398,209 B2 * | 7/2008 | Kennewick et al. | 704/255 |
| 7,502,738 B2 * | 3/2009 | Kennewick et al. | 704/257 |
| 7,590,626 B2 * | 9/2009 | Li et al. | 707/708 |
| 7,702,508 B2 * | 4/2010 | Bennett | 704/257 |
| 8,041,568 B2 * | 10/2011 | Strope et al. | 704/257 |
| 2002/0019737 A1 * | 2/2002 | Stuart et al. | 704/275 |
| 2009/0228280 A1 * | 9/2009 | Oppenheim et al. | 704/275 |

FOREIGN PATENT DOCUMENTS

JP    3420965 B2    9/2000

* cited by examiner

*Primary Examiner* — Talivaldis Ivars Smits
(74) *Attorney, Agent, or Firm* — Ohlandt, Greeley, Ruggiero & Perle, L.L.P.

(57) ABSTRACT

A spoken dialogue apparatus is provided. The apparatus includes a speech recognition unit, a retrieval unit, a calculation unit, and a selection unit. The speech recognition unit performs speech recognition of an input speech to obtain a recognition candidate. The retrieval unit updates a retrieval condition by use of the recognition candidate and outputs a retrieval result. The calculation unit calculates estimated numbers of data as costs concerning a first response and a second response based on the retrieval condition and the retrieval result. The selection unit selects a response having a lowest cost and presents the response to the user.

12 Claims, 9 Drawing Sheets

| Data ID | Amenity name | Prefecture name | City name | Category |
|---|---|---|---|---|
| 1 | アート美術館 | A prefecture | ○○ city | Art gallery |
| 2 | ダンス会館 | A prefecture | △○ city | Hall |
| 3 | ハート美術館 | C prefecture | ×○ city | Art gallery |
| 4 | バード博物館 | C prefecture | ○× city | Museum |
| 5 | アソ秘蔵院 | E prefecture | □○ city | Museum |
| 6 | カヤノ技術館 | E prefecture | □○ city | Museum |
| 7 | アヤコ美食軒 | E prefecture | □○ city | Restaurant |
| ... | ... | ... | ... | ... |

F I G. 3

| Attribute=amenity name |
|---|
| ハート美術館　(score=50) |
| バード博物館　(score=45) |
| アート美術館　(score=40) |
| カヤノ技術館　(score=35) |
| アソ秘蔵院　(score=35) |
| アヤコ美食軒　(score=33) |
| ... |

F I G. 4A

| |
|---|
| 3(amenity name=ハート美術館, prefecture name=C prefecture, city name=×○ city, category=art gallery) |
| 4(amenity name=ハート美術館, prefecture name=C prefecture, city name=○× city, category=museum) |
| 1(amenity name=アート美術館, prefecture name=A prefecture, city name=○○ city, category=art gallery) |
| 6(amenity name=カヤノ技術館, prefecture name=E prefecture, city name=□○ city, category=museum) |
| 5(amenity name=アソ秘蔵院, prefecture name=E prefecture, city name=□○ city, category=museum) |
| 7(amenity name=アヤコ美食軒, prefecture name=E prefecture, city name=□○ city, category=restaurant) |
| ... |

FIG. 4B

| Attribute=amenity name | Attribute=city name |
|---|---|
| ハート美術館 (score=50) | ○□ city (score=85) |
| バード博物館 (score=45) | ○○ city (score=85) |
| アート美術館 (score=40) | ×○ city (score=70) |
| カヤノ技術館 (score=35) | □○ city (score=40) |
| アソ秘蔵院 (score=35) | △× city (score=35) |
| アヤコ美食軒 (score=33) | △△ city (score=30) |
| ... | ... |

FIG. 5A

3(amenity name=ハート美術館, prefecture name=C prefecture, city name=X○ city, category=art gallery)

1(amenity name=アート美術館, prefecture name=A prefecture, city name=○○ city, category=art gallery)

6(amenity name=カヤノ技術館, prefecture name=E prefecture, city name=□○ city, category=museum)

5(amenity name=アソ秘蔵院, prefecture name=E prefecture, city name=□○ city, category=museum)

7(amenity name=アヤコ美食軒, prefecture name=E prefecture, city name=□○ city, category=restaurant)

F I G. 5B

| Attribute=amenity name | |
|---|---|
| ハート美術館 | (score=50) |
| アート美術館 | (score=40) |
| カヤノ技術館 | (score=35) |
| アソ秘蔵院 | (score=35) |
| アヤコ美食軒 | (score=33) |

| Attribute=city name | |
|---|---|
| ○○ city | (score=85) |
| X○ city | (score=70) |
| □○ city | (score=40) |

F I G. 6

```
SYS1: Input amenity name
USR2: アート美術館
SYS3: Input city name
USR4: ○○ city
SYS5: Is it ○○ city?
USR6: Yes
SYS7: Is it アート美術館?
USR8: Yes
```

FIG. 7

```
1(amenity name=アート美術館, prefecture name=A prefecture,
city name=○○ city, category=art gallery)
```

FIG. 8A

| Attribute=amenity name | Attribute=city name(approved) |
|---|---|
| アート美術館(score=40) | ○○ city(score=85) |

FIG. 8B

| Attribute=amenity name(approved) | Attribute=city name (approved) |
|---|---|
| アート美術館(score=40) | ○○ city (score=85) |

FIG. 9A

```
1(amenity name=アート美術館, prefecture name=A prefecture,
city name=○○ city, category=art gallery)
```

FIG. 9B

| Word | Word information(reading) |
|---|---|
| アート美術館 | あーとびじゅつかん |
| ダンス会館 | だんすかいかん |
| ハート美術館 | はーとびじゅつかん |
| ... | ... |
| ○○ city | ○○ city |
| △○ city | △○ city |
| ... | ... |
| A prefecture | A prefecture |
| C prefecture | C prefecture |
| ... | ... |
| Art gallery | Art gallery |
| Hall | Hall |
| ... | ... |
| Yes | Yes |
| No | No |

FIG. 10

| |
|---|
| Attribute=prefecture name(approved) |
| C prefecture(score=60) |

FIG. 11A

| |
|---|
| Attribute=prefecture name |
| C prefecture excluded |

FIG. 11B

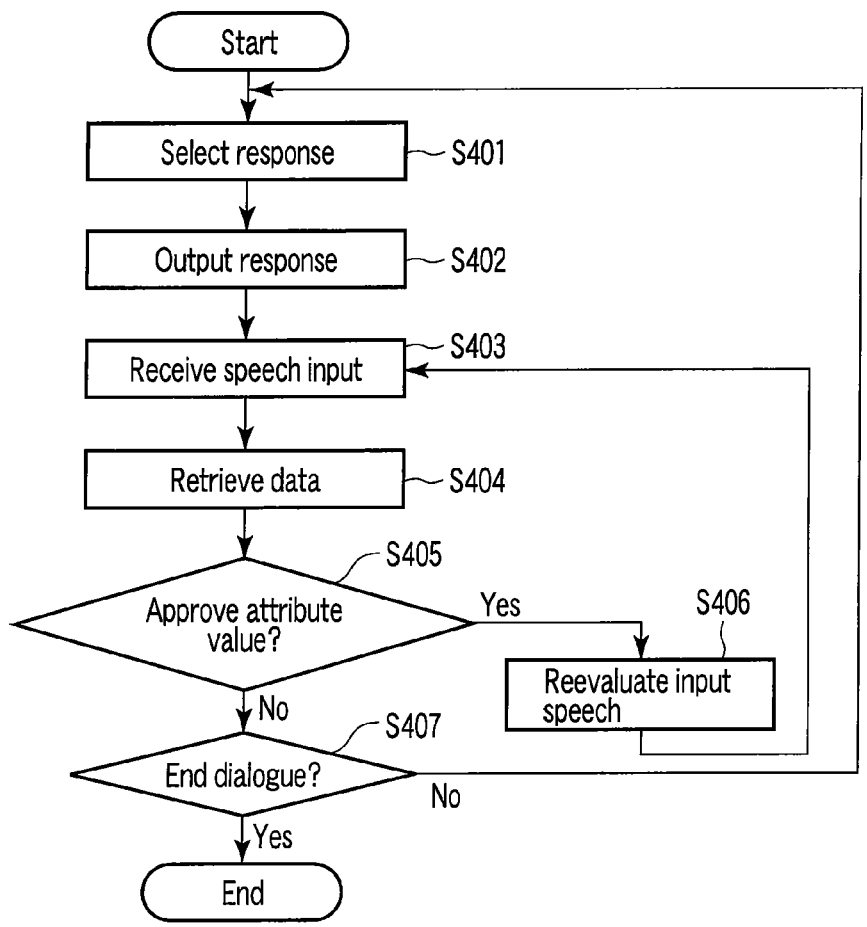

FIG. 13

| |
|---|
| 3(amenity name=アート美術館, prefecture name=C prefecture, city name=×○ city, category=art gallery) |
| 1(amenity name=アート美術館, prefecture name=A prefecture, city name=○○ city, category=art gallery) |
| 6(amenit name=カヤノ美術館, prefecture name=E prefecture, city name=□○ city, category=museum) |
| 5(amenity name=アソ秘蔵館, prefecture name=E prefecture, city name=□○ city, category=museum) |
| 7(amenity name=アヤコ美食軒, prefecture name=E prefecture, city name=□○ city, category=restaurant) |

FIG. 14A

SPOKEN DIALOGUE SPEECH RECOGNITION USING ESTIMATED NUMBER OF RETRIEVED DATA AS COST

CROSS-REFERENCE TO RELATED APPLICATIONS

This application is based upon and claims the benefit of priority from prior Japanese Patent Application No. 2008-061458, filed Mar. 11, 2008, the entire contents of which are incorporated herein by reference.

BACKGROUND OF THE INVENTION

1. Field of the Invention

The present invention relates to a spoken dialogue apparatus for performing narrowed retrieval of data desired by a user from a database in accordance with a dialogue.

2. Description of the Related Art

A spoken dialogue apparatus has conventionally used a speech recognition result of a speech input of a user to retrieve data desired by the user from a database. Specifically, the database stores data in association with attribute values concerning a plurality of attributes of the data. The spoken dialogue apparatus presents a response to ask the user to input an attribute value concerning a certain attribute, and retrieves from the database data having, as an attribute value, a speech recognition result of an input speech of the user corresponding to the response.

Japanese Patent No. 3420965 describes a spoken dialogue apparatus which uses a plurality of recognition candidates to retrieve data in the following procedure without narrowing down to one speech recognition result, in order to compensate for inaccuracy of speech recognition. First, a response asking the user to input an attribute value concerning a first attribute is presented, and a first speech recognition result of an input speech of the user corresponding to the response is obtained. Then, a response asking the user to input an attribute value concerning a second attribute is presented, and a second speech recognition result of an input speech of the user corresponding to the response are obtained. In addition, each of the first and second speech recognition results includes a plurality of recognition candidates as described above.

Subsequently, the first speech recognition result and the second speech recognition result are combined to produce a retrieval condition, and desired data is retrieved from the database. That is, such data is retrieved from the database that the attribute value concerning the first attribute is one of the candidates of the first speech recognition result and that the attribute value concerning the second attribute is one of the candidates of the second speech recognition result. The dialogue is ended if the number of data items included in the retrieval result (hereinafter referred to as retrieved data) is less than or equal to a predetermined number, and the retrieved data is presented to the user as the desired data. On the other hand, if the number of retrieved data items is beyond the predetermined number, a response asking the user to input an attribute value concerning another attribute is presented, and combining and retrieval are repeated on the basis of a speech recognition result of an input speech of the user corresponding to the response.

The spoken dialogue apparatus described in Japanese Patent No. 3420965 presents a response asking the user to input an attribute value until the number of retrieved data items becomes less than or equal to the predetermined number. However, a response asking the user to input an attribute value is not necessarily a response that effectively decreases the number of retrieved data items. For example, when the distribution of attribute values concerning attribute which the user is asked to input is not uniform, a significant decrease in the number of retrieved data items cannot be expected. That is, if the recognition candidates included in the speech recognition result of the speech input of the user corresponding to the above-mentioned response are inclined to attribute values having a large number of data items, there is almost no decrease in the retrieved data. Therefore, simply repeating the response asking the user to input an attribute value may unnecessarily increase the number of user inputs and the number of dialogue turns before desired data is presented. The increase in the number of inputs and the number of dialogue turns decreases the degree of satisfaction of the user.

On the other hand, a response asking the user to ascertain whether one of the recognition candidates of the already obtained speech recognition result is a correct attribute value (i.e., the attribute value actually speech input by the user) may be a response that effectively decreases the number of retrieved data items. For example, data which has this attribute value is excluded from the retrieved data if an attribute value having a large number of data items is denied by the user, so that the number of retrieved data items effectively decreases. Alternatively, data which does not have this attribute value is excluded from the retrieved data if an attribute value having a small number of data items is approved by the user, so that the number of retrieved data items effectively decreases.

As described above, the response presented to the user by the conventional spoken dialogue apparatus is not necessarily a response whereby a decrease in the number of retrieved data items can be most expected. Therefore, the number of user inputs and the number of dialogue turns before the spoken dialogue apparatus presents desired data may be unnecessarily increased.

BRIEF SUMMARY OF THE INVENTION

According to an aspect of the invention, there is provided a spoken dialogue apparatus which retrieves desired data from a data storage unit storing data in association with attribute values concerning a plurality of attributes of the data, comprising: a speech recognition unit configured to perform speech recognition of an input speech of a user for a presented response to obtain a recognition candidate in one attribute from recognition target words corresponding to the presented response; a retrieval unit configured to update a retrieval condition by use of the recognition candidate and retrieve data corresponding to the retrieval condition from the data storage unit to output as a retrieval result; a calculation unit configured to calculate estimated numbers of data as costs concerning a first response and a second response based on the retrieval condition and the retrieval result, the data being included in retrieval result after narrowed retrieval performed in accordance with an input speech corresponding to the first response asking the user to input an attribute value of an attribute which has not been input and corresponding to the second response ascertaining the truth of an attribute value of an attribute which has been input; and a selection unit configured to select a response having the lowest cost and present the response to the user.

BRIEF DESCRIPTION OF THE SEVERAL VIEWS OF THE DRAWING

FIG. 3 is a diagram showing data and attribute values of this data which are stored in a data storage unit in FIG. 1;

FIG. 4A is a diagram showing retrieval conditions saved in a dialogue state management unit in FIG. 1;

FIG. 4B is a diagram showing retrieval results saved in the dialogue state management unit in FIG. 1;

FIG. 5A is a diagram showing retrieval conditions saved in the dialogue state management unit in FIG. 1;

FIG. 5B is a diagram showing retrieval results saved in the dialogue state management unit in FIG. 1;

FIG. 6 is a diagram showing retrieval conditions saved in the dialogue state management unit in FIG. 1;

FIG. 7 is a diagram showing a dialogue between the spoken dialogue apparatus in FIG. 1 and a user;

FIG. 8A is a diagram showing a retrieval result saved in the dialogue state management unit in FIG. 1;

FIG. 8B is a diagram showing retrieval conditions saved in the dialogue state management unit in FIG. 1;

FIG. 9A is a diagram showing retrieval conditions saved in the dialogue state management unit in FIG. 1;

FIG. 9B is a diagram showing a retrieval result saved in the dialogue state management unit in FIG. 1;

FIG. 10 is a diagram showing words and readings of the words which are stored in a word storage unit in FIG. 1;

FIG. 11A is a diagram showing a retrieval condition saved in a dialogue state management unit of a spoken dialogue apparatus according to a third embodiment;

FIG. 11B is a diagram showing a retrieval condition saved in the dialogue state management unit of the spoken dialogue apparatus according to the third embodiment;

FIG. 13 is a flowchart showing a flow of operations of a spoken dialogue apparatus according to a fifth embodiment;

FIG. 14A is a diagram showing retrieval results saved in a dialogue state management unit of the spoken dialogue apparatus according to the fifth embodiment;

DETAILED DESCRIPTION OF THE INVENTION

Embodiments of the present invention will hereinafter be described with reference to the drawings.

First Embodiment

Figure 1:
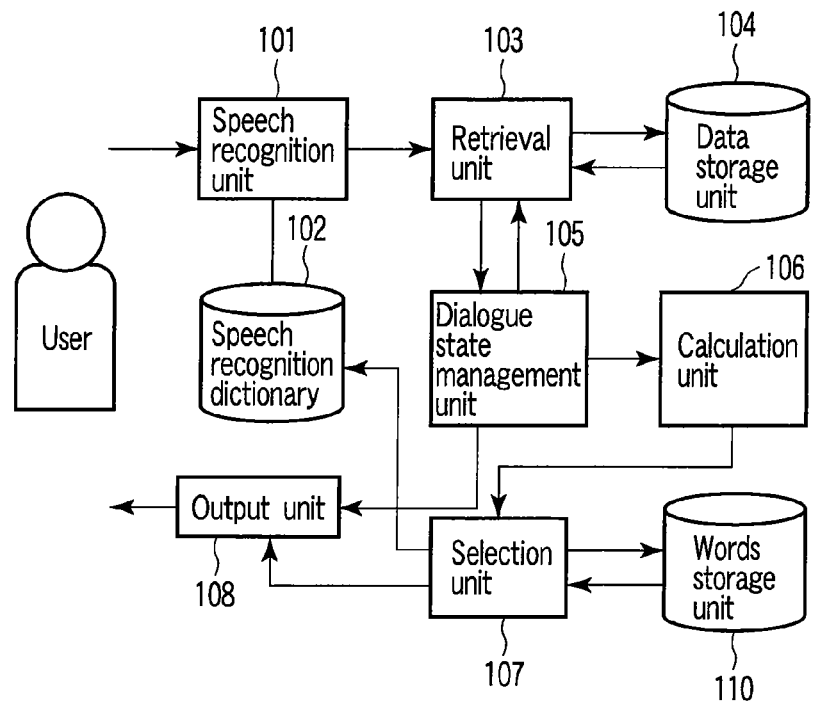
FIG. 1 is a block diagram showing a spoken dialogue apparatus according to a first embodiment.

As shown in FIG. 1, a spoken dialogue apparatus according to a first embodiment of the present invention has a speech recognition unit 101, a speech recognition dictionary storage unit 102, a retrieval unit 103, a data storage unit 104, a dialogue state management unit 105, a calculation unit 106, a selection unit 107, an output unit 108 and a word storage unit 110.

The speech recognition unit 101 recognizes which of recognition target words registered in a speech recognition dictionary stored in the speech recognition dictionary storage unit 102 described later an input speech from a user corresponds to. Specifically, the speech recognition unit 101 calculates a score (degree of reliability) indicating the likelihood of each of the recognition target words that it corresponds to the input speech. That is, the recognition target words of higher scores are closer to the input speech. The speech recognition unit 101 inputs, as a recognition candidate, recognition target words having a score greater than or equal to a certain level to the retrieval unit 103 together with the score. In addition, the input speech is not effective if there is no recognition target word having a score greater than or equal to the certain level, so that a response asking the user for an input speech is again presented by the output unit 108 described later. Alternatively, the speech recognition unit 101 may input a ranking obtained by arranging recognition candidates in descending order of score to the retrieval unit 103, instead of the score. When the speech recognition unit 101 inputs the ranking to the retrieval unit 103 instead of the score, the retrieval unit 103 estimates the degree of reliability of a recognition candidate on the basis of the ranking.

The speech recognition dictionary storage unit 102 stores the speech recognition dictionary in which recognition target words are registered. The speech recognition dictionary is properly updated in accordance with a response selected by the selection unit 107 described later. For example, if a (A) first response asking the user to input an attribute value concerning an attribute which has not yet been input is selected, the speech recognition dictionary is updated so that a word indicating the attribute value concerning this attribute may be recognition target words. Alternatively, if a (B) second response ascertaining the truth of one attribute value in an attribute which has already been input is selected, the speech recognition dictionary is updated so that a word indicating an approval and a word indicating a denial may be recognition target words.

The retrieval unit 103 updates a retrieval condition saved in the dialogue state management unit 105 described later by use of the recognition candidates and scores from the speech recognition unit 101. Here, the retrieval condition is, in each attribute, a set of attribute values narrowed down to by repeating the presentation of a response and a speech input of a user corresponding to the response. There is a good possibility that one attribute value included in a retrieval condition in a certain attribute may be an attribute indicating the contents of the speech input of the user in this attribute. The retrieval unit 103 retrieves data having an attribute value included in the updated retrieval condition from the data storage unit 104, and obtains a retrieval result which is a set of the data. Specifically, the retrieval unit 103 retrieves data having one of the attribute values included in the retrieval condition in each attribute. That is, if retrieval conditions are specified in a plurality of attributes, the retrieval unit 103 retrieves data having one of the attribute values included in the retrieval conditions in all the specified attributes. The retrieval unit 103 uses the above-mentioned the retrieval result to update retrieval result stored in the dialogue state management unit 105, and removes the attribute values which are not associated with the data for the retrieval result from the retrieval condition. The retrieval condition can be simplified by removing the unnecessary attribute values from the retrieval condition. In addition, the retrieval unit 103 may omit the processing for removing the attribute values which are unnecessary during the update of the retrieval condition. For example, the retrieval result is null when a speech input from the user contradicts the contents stored in the data storage unit 104, so that a retrieval error can be detected at an earlier stage.

If a response which has most recently been presented from the output unit 108 is the (A) first response asking the user to input an attribute value concerning an attribute which has not yet been input, the retrieval unit 103 adds, as an attribute value concerning the above-mentioned attribute, a recognition candidate from the speech recognition unit 101 together with the score of the recognition candidate, thereby updating the retrieval conditions saved in the dialogue state management unit 105.

If a response which has most recently been presented from the output unit 108 is the (B) second response ascertaining the truth of one attribute value in an already input attribute, the retrieval unit 103 treats the recognition candidate from the speech recognition unit 101 as an approval or denial in accordance with the score. Specifically, when the recognition candidate from the speech recognition unit 101 indicates an approval, the retrieval unit 103 maintains the above-mentioned attribute value as an approved attribute value and deletes the attribute values other than the approved attribute value to update the retrieval conditions saved in the dialogue state management unit 105. On the other hand, when the recognition candidate from the speech recognition unit 101 indicates a denial, the retrieval unit 103 deletes the above-mentioned attribute value alone to update the retrieval conditions saved in the dialogue state management unit 105.

The data storage unit 104 stores data in association with attribute values concerning a plurality of attributes. As shown in FIG. 3, the data storage unit 104 may store the name of the attribute value of each data to allow reference.

The dialogue state management unit 105 manages the status of a dialogue. Specifically, the dialogue state management unit 105 stores retrieval conditions and retrieval results as the status of a current dialogue, and continues or ends the dialogue on the basis of the retrieval result. It is to be noted that the retrieval result is null at the start of a dialogue between the user and the spoken dialogue apparatus in FIG. 1, and all the data stored in the data storage unit 104 are saved as retrieval results. Moreover, as described later, the retrieval result may include attributes and names of attribute values for use in the presentation of a response sentence in the output unit 108 as described later.

When determining that desired data is narrowed down to or the retrieval result is null as a result of the update of the retrieval result by the retrieval unit 103, the dialogue state management unit 105 inputs the retrieval result to the output unit 108 to end the dialogue. On the other hand, when the dialogue is continued, the dialogue state management unit 105 inputs the current retrieval condition and retrieval result to the calculation unit 106.

If the current number of retrieved data items is one and if the attribute value concerning an attribute which can specify the data has been approved, the dialogue state management unit 105 determines that desired data has been narrowed down to. The attribute which can specify data is, for example, the name of the data, and is desirably such an attribute that each data has a unique attribute value. Moreover, an attribute having the most kinds of attribute values in the data storage unit 104 may be the attribute which can specify data. Alternatively, the dialogue state management unit 105 may determine that desired data is narrowed down to if the current number of retrieved data items is less than or equal to a predetermined number.

The calculation unit 106 calculates a cost of a response to be presented to the user next on the basis of the retrieval condition and retrieval result from the dialogue state management unit 105. In addition, details of the calculation of the cost by the calculation unit 106 will be described later. Here, a response presented to the user by the spoken dialogue apparatus in FIG. 1 is either the (A) first response asking the user to input an attribute value concerning an attribute which has not yet been input or the (B) second response ascertaining the truth of one attribute value in an already input attribute. The calculation unit 106 calculates costs of the first response or the second response for the attributes stored in the data storage unit 104, and inputs the costs to the selection unit 107. However, the calculation unit 106 does not calculate a cost of a response concerning an attribute for which the attribute value has already been approved.

The selection unit 107 selects a response having the minimum cost calculated from the calculation unit 106, and reports the selected response to the output unit 108. In addition, when there are a plurality of responses having the minimum cost, the selection unit 107 selects a response on the basis of the number of the kinds of attribute values. For example, the selection unit 107 may select a response concerning an attribute having the maximum number of the kinds of attribute values. Alternatively, in order to improve the accuracy of speech recognition in the speech recognition unit 101, the selection unit 107 may select a response concerning an attribute having the minimum number of the kinds of attribute values.

Furthermore, the selection unit 107 acquires recognition target words from the word storage unit 110 in accordance with the selected response, and uses this recognition target words to update the speech recognition dictionary stored in the speech recognition dictionary storage unit 102. Specifically, as described above, when selecting the (A) first response asking the user to input an attribute value concerning an attribute which has not yet been input, the selection unit 107 acquires information on words indicating the attribute values concerning this attribute from the word storage unit 110 as recognition target words. Alternatively, when selecting the (B) second response ascertaining the truth of one attribute value in an already input attribute, the selection unit 107 acquires information on a word indicating an approval and a word indicating a denial from the word storage unit 110 as recognition target words.

In addition, when the selection unit 107 acquires the information on the words indicating the attribute values from the word storage unit 110, only the attribute values associated with the current retrieved data is targeted. However, if the accuracy of speech recognition in the speech recognition unit 101 is sufficiently high, all the attribute values stored in the data storage unit 104 may be targeted for acquisition. If all the attribute values are targeted for acquisition, the retrieval result is null when a speech input from the user contradicts the contents stored in the data storage unit 104, so that a retrieval error can be detected at an earlier stage. Alternatively, the selection unit 107 may be changed in accordance with an attribute as to whether to target an attribute value associated with a retrieval result or all the attribute values for acquisition. For example, there is less possibility of a speech recognition error in the case of an attribute having fewer kinds of attribute values, so that the accuracy of speech recognition in the speech recognition unit 101 does not matter much even if all the attribute values are targeted for acquisition.

The output unit 108 is, for example, a display and/or speaker, and presents a response or a retrieval result to the user by the presentation of an image, by the presentation of a text, by the output of sound, or by a combination of these. The output unit 108 presents the response selected by the selection unit 107 to the user. For example, if the selection unit 107 selects the (A) first response asking the user to input an attribute value concerning an attribute which has not yet been input, the output unit 108 presents a response sentence such as "Please input (an attribute name)". In addition, the words in parentheses in the response sentence indicate a variable, and a name corresponding to the attribute such as an "amenity name" is actually substituted. Alternatively, if the selection unit 107 selects the (B) second response ascertaining the truth of one attribute value in an already input attribute, the output unit 108 presents a response sentence such as "Is it (an attribute value)?". In addition, the words in parentheses in the response sentence indicate a variable, and a name corresponding to the attribute value such as a "アート美 術館" is actually substituted.

In addition, the output unit 108 may acquire names corresponding to the attributes and attribute values via the dialogue state management unit 105 for use in the presentation of a response sentence. For example, the output unit 108 can present the response sentences such as "Please input 'amenity name'" and "Is it 'アート 美術館'?" to the user.

Furthermore, on receipt of a retrieval result from the dialogue state management unit 105, the output unit 108 presents the retrieval result to the user. That is, if the retrieval result from the dialogue state management unit 105 includes data, the output unit 108 presents to the user the data as desired data as well as the fact that the retrieval has been successful. On the other hand, if the retrieval result from the dialogue state management unit 105 is null, the output unit 108 presents to the user the fact that the retrieval has been unsuccessful.

The word storage unit 110 stores words indicating the attribute values stored in the data storage unit 104 and indicating affirmative and negative expressions by the user, in association with word information (reading) necessary for the speech recognition of the words. In addition, the word storage unit 110 and the data storage unit 104 may be combined. Moreover, word information may be automatically generated from the transcriptions of the attribute values stored in the data storage unit 104 without providing the word storage unit 110. Alternatively, a configuration or processing may be provided which is capable of acquiring word information from the transcriptions of the attribute values or IDs.

Next, the calculation of the cost by the calculation unit 106 will be described. As described above, the calculation unit 106 calculates a cost of the (A) first response asking the user to input an attribute value concerning an attribute which has not yet been input or a cost of the (B) second response ascertaining the truth of one attribute value in an already input attribute. The two kinds of costs indicate estimated numbers of retrieved data items after a narrowed retrieval by the next speech input of the user. Therefore, a decrease in the number of data items can be more expected by the next speech input of the user in the case of a lower cost.

[(A) Cost of the First Response Asking the User to Input an Attribute Value Concerning an Attribute ArgX which has not Yet Been Input: CAdd(ArgX)]

An expected value of the number of retrieved data items after a narrowed retrieval by a speech input of the user may be calculated as a cost CAdd(ArgX). However, in order to calculate the expected value, there is a need for the probability of the emergence of each attribute value ArgX_i as a recognition candidate as a result of the speech recognition of a speech input of the user in the speech recognition unit 101. This probability is difficult to find in advance because the speech input of the user is indefinite.

Thus, the calculation unit 106 calculates the maximum number of retrieved data items after a narrowed retrieval by a speech input of the user as the cost CAdd(ArgX) on the basis of the number of the kinds of attribute values ArgX_i in the attribute value ArgX that the retrieved data after the narrowed retrieval can have. Here, although the maximum number of retrieved data items after a narrowed retrieval is calculated as the cost CAdd(ArgX), an average number, for example, may be calculated. However, it is desirable that the maximum number of retrieved data items after a narrowed retrieval be calculated as the cost CAdd(ArgX) if the risk of being unable to decrease the number of data items is taken into account.

Described below are specific operations of the calculation unit 106 in the case where the maximum number of retrieved data items after a narrowed retrieval is calculated as the cost CAdd(ArgX). It is assumed here that the number N(ArgX) of the kinds of attribute values ArgX_i in the attribute ArgX of retrieved data from the dialogue state management unit 105 is decreased to ceil(N(ArgX)*β) due to the narrowed retrieval by the speech input of the user. In addition, ceil( ) indicates a rounding function for raising decimals to the next whole number, and β indicates the decrease rate (0<β<=1) of the kinds of attribute values. The decrease rate β may be determined, but is not specifically limited to, on the basis of, for example, the accuracy of speech recognition in the speech recognition unit 101. The number of data items having the attribute values ArgX_i in the attribute ArgX included in the retrieval result from the dialogue state management unit 105 is C(ArgX_i). Further, the number of j-th data when the number of data items C(ArgX_i) is arranged in descending order is indicated by C_sort(ArgX_j). That is, the number of data items C_sort(ArgX, 1) indicates the maximum value of the number of data items C(ArgX_i). The cost CAdd(ArgX) is equal to the total of the numbers of data C_sort(ArgX, j) from the first one to the ceil(N(ArgX)*β)-th one, and is expressed by the following expression:

$$CAdd(ArgX) = \sum_{(j=1 \to ceil(N(ArgX)*\beta))} C\_sort(ArgX, j) \quad (1)$$

where "$\Sigma_{(j=a \to b)} f(j)$" indicates "the total of f(j) when j is changed from a to b". As described above, the calculation unit 106 calculates the maximum number of data items which can be included in a retrieval result after a narrowed retrieval on the basis of the number ceil(N(ArgX)*β) of the kinds of attribute values ArgX_i in the attribute value ArgX that the retrieved data after the narrowed retrieval can have. Consequently, according to Expression 1, it is possible to calculate an estimated number of retrieved data items after the narrowed retrieval in the case where the recognition candidates obtained by the speech recognition unit 101 are inclined to attribute values having a large number of data items (i.e., in the case where the number of data items is least decreased).

On the other hand, in Expression 1, C_sort(ArgX, j) can be difficult to calculate when the total number of retrieved data items from the dialogue state management unit 105 is great. In such a case, the calculation unit 106 may calculate the cost CAdd(ArgX) in accordance with "CAdd(ArgX)=TOTAL*β" (this expression is referred to as Expression 1') instead of Expression 1 on the assumption that the number of data items having the respective attribute values ArgX_i is uniformly distributed. TOTAL in Expression 1' indicates the total number of retrieved data items from the dialogue state management unit 105. In addition, in such a case (Expression 1' should be used), it is possible to detect by, for example, threshold processing of the total number of data items TOTAL. Moreover, when Expression 1' is used, a cost CAdd(ArgY) concerning an attribute ArgY different from the attribute ArgX is equal to CAdd(ArgX). That is, there is no difference between attributes of the costs of the first response. However, it is possible to compare the cost of the first response with the cost of the (B) later-described second response ascertaining the truth of one attribute value in an already input attribute.

[(B) Cost of the Second Response Ascertaining the Truth of One Attribute Value in an Already Input Attribute: CConf (ArgX)]

The cost CConf(ArgX) is a cost for ascertaining whether a top attribute value ArgX_top in the already input attribute ArgX is the attribute value speech input by the user. Here, the top attribute value ArgX_top is an attribute value having the highest score provided by the speech recognition unit 101 regarding the attribute ArgX. That is, the top attribute value ArgX_top is most likely to be the attribute value speech input by the user. The cost CConf(ArgX) is an expected value of the number of retrieved data items after the narrowed retrieval in the case where it is ascertained whether the attribute value ArgX_top is the attribute value input by the user. The cost CConf(ArgX) is expressed by the following expression:

$$CConf(ArgX) = p*C(ArgX\_top) + (1-p)* (TOTAL - C(ArgX\_top)) \quad (2)$$

where p is the degree of reliability of the attribute value ArgX_top as a speech input ($0 \leq p \leq 1$). p can be calculated from the score of the attribute value ArgX_top saved in the dialogue state management unit 105. For example, if the score provided by the speech recognition unit 101 is the degree of reliability which represents the likelihood of corresponding to the input speech as described above, the calculation unit 106 uses this score as p without modification. Alternatively, before the start of a dialogue with the user, the calculation unit 106 may collect the score provided by the speech recognition unit 101 and data on the actual percentage of correct answers to find the correspondence therebetween, and calculate p from the score on the basis of the correspondence.

Figure 2:
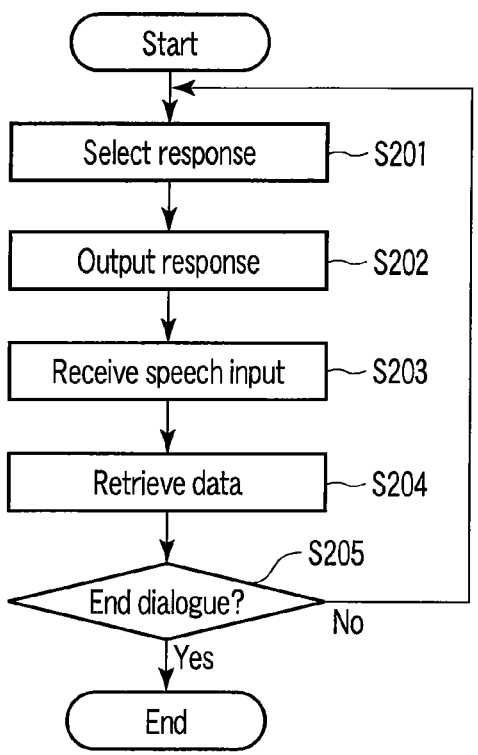
FIG. 2 is flowchart showing operations of the spoken dialogue apparatus in FIG. 1.

One example of the operations of the spoken dialogue apparatus in FIG. 1 is described below using a flowchart shown in FIG. 2.

When a dialogue between the user and the spoken dialogue apparatus in FIG. 1 is started, processing moves to step S201. In step S201, the calculation unit 106 calculates a cost of each response, and the selection unit 107 selects a response having the minimum cost as a response to be presented to the user next. The selection unit 107 acquires recognition target words from the word storage unit 110 in accordance with the selected response, and uses this recognition target words to update the speech recognition dictionary stored in the speech recognition dictionary storage unit 102, and also inputs this response to the output unit 108.

Then, the output unit 108 presents to the user the response selected in step S201 (step S202). Further, an input speech of the user corresponding to the response presented in step S202 is received by, for example, an unshown microphone (step S203). The received input speech is recognized by the speech recognition unit 101. A recognition candidate which has obtained a score greater than or equal to a certain level as a result of the speech recognition by the speech recognition unit 101 is input to the retrieval unit 103 together with the score.

In addition, in step S203, when it is detected by, for example, timer processing that there is no speech input from the user for a given period, the processing may be advanced considering that some kind of input has been made. For example, if the response presented in step S202 is the previously mentioned second response, the output unit 108 presents to the user a text such as "Narrow down with (ArgX_top)", and if there is no speech input of the user for this text for a given period, recognition candidate indicating an approval may be input to the retrieval unit 103.

Then, the retrieval unit 103 uses the recognition candidate and the score obtained in step S203 to update the retrieval condition saved in the dialogue state management unit 105, and uses the updated retrieval condition to retrieve desired data from the data storage unit 104 (step S204). The retrieval unit 103 uses the obtained retrieval result to update the retrieval result saved in the dialogue state management unit 105.

Then, the dialogue state management unit 105 decides whether to end or continue the dialogue on the basis of the retrieval result obtained in step S204 (step S205). When it is decided in step S205 that the dialogue is continued, the processing returns to step S201. On the other hand, when it is decided in step S205 that the dialogue is ended, the retrieval result is presented to the user from the output unit 108, and the processing ends.

Specific operations of the spoken dialogue apparatus in FIG. 1 are described below in detail along with a dialogue example shown in FIG. 7. In addition, although an amenity database is targeted for retrieval in the following description, the database targeted for retrieval by the spoken dialogue apparatus according to the present embodiment is not limited thereto. Specifically, a database storing data in association with the attribute values concerning each attribute can be targeted for retrieval. For example, the retrieval target may be a database storing data in association with attributes of this data "brand name" and "counter", or a database storing data in association with attributes of this data "employee's names" and "posts and telephone numbers".

In FIG. 7, "SYS" indicates a response presented by the output unit 108, "USR" indicates a speech input of the user corresponding to this response, and data desired by the user is "art gallery 'アート美術館'" situated in OO city, A prefecture". Moreover, in the following description, a score calculated by the speech recognition unit 101 is indicated by the percentage of p representing the likelihood of each recognition candidate that it corresponds to a speech input, and the above-mentioned decrease rate β is equal to 0.03.

The data storage unit 104 is the amenity retrieval database shown in FIG. 3, and stores data for 20000 cases in association with amenity names (20000 kinds), prefecture names (47 kinds), city names (4000 kinds) and categories (80 kinds) as attributes of the data. In addition, in FIG. 3, each data is identified by a data ID, and the attribute "amenity name" is an attribute which can identify the data.

As shown in FIG. 10, the word storage unit 110 stores words indicating the attribute values concerning the attributes stored in the data storage unit 104 and indicating affirmative and negative expressions by the user, in association with word information (reading) necessary for the speech recognition of the words.

When a dialogue between the spoken dialogue apparatus and the user is started, the calculation unit 106 calculates a cost of each response, and the selection unit 107 selects a response having the minimum cost as a response to be presented to the user next (step S201). The calculation unit 106 calculates a "cost CAdd (amenity name) of a response asking the user to input an attribute value in the attribute 'amenity name'", a "cost CAdd (prefecture name) of a response asking the user to input an attribute value in the attribute 'prefecture name'", a "cost CAdd (city name) of a response asking the user to input an attribute value in the attribute 'city name'", and a "cost CAdd (category) of a response asking the user to input an attribute value in the attribute 'category'".

However, since the number of data items is too large (20000) in an initial state, the calculation unit 106 calculates costs CAdd ( ) on the basis of Expression 1' mentioned above.

Thus, the four costs CAdd (amenity name), CAdd (prefecture name), CAdd (city name) and CAdd (category) are equal to each other (20000*0.03=600), and the selection unit 107 gives priority to the attribute (amenity name) having the most kinds of attribute values and selects the "response asking the user to input an attribute value in the attribute 'amenity name'" as SYS1. The selection unit 107 acquires recognition target words from the word storage unit 110 in accordance with the selected response SYS1, and uses this recognition target words to update the speech recognition dictionary stored in the speech recognition dictionary storage unit 102, and also inputs this response SYS1 to the output unit 108. Specifically, the selection unit 107 uses the attribute value in the attribute "amenity name" as a key to retrieve a word from the word storage unit 110, acquires word informations (readings) for this words as recognition target words, and updates the speech recognition dictionary stored in the speech recognition dictionary storage unit 102.

Then, the output unit 108 presents to the user the response SYS1 selected in step S201 (step S202). Further, an input speech USR2 from the user is received by the unshown microphone (step S203). The received input speech USR2 is recognized by the speech recognition unit 101. A recognition candidate which has obtained a score greater than or equal to a certain level as a result of the speech recognition by the speech recognition unit 101 is input to the retrieval unit 103 together with the score.

Then, the retrieval unit 103 uses the recognition candidate and the score obtained in step S203 to update the retrieval condition saved in the dialogue state management unit 105 as shown in FIG. 4A, and uses the updated retrieval condition to retrieve desired data from the data storage unit 104 (step S204). The retrieval unit 103 uses the obtained retrieval result to update the retrieval result saved in the dialogue state management unit 105 as shown in FIG. 4B (500 data are included). In addition, in the following description, the retrieval result is shown in the form of "data ID (attribute name=attribute value, . . . )" so that the data and the attribute value of this data are easily understood.

Then, as the number of retrieved data items obtained in step S204 is 500, the dialogue state management unit 105 decides to continue the dialogue (step S205), and the processing returns to step S201.

In step S201, the calculation unit 106 calculates a cost of each response, and the selection unit 107 selects a response having the minimum cost as a response to be presented to the user next. The attribute value in the attribute "amenity name" has already been input. Thus, the calculation unit 106 calculates a "cost CConf (amenity name) of a response ascertaining the truth of one attribute value in the attribute 'amenity name'", a "cost CAdd (prefecture name) of a response asking the user to input an attribute value in the attribute 'prefecture name'", a "cost CAdd (city name) of a response asking the user to input an attribute value in the attribute 'city name'", and a "cost CAdd (category) of a response asking the user to input an attribute value in the attribute 'category'".

It is assumed that the following information has been obtained from the retrieval result shown in FIG. 4B.

$C\_sort(\text{prefecture name}, n1)=11(n1=1\text{-}30),$
$C\_sort(\text{prefecture name}, n2)=10(n2=31\text{-}47)$ $C\_sort(\text{city name}, 1)=3, C\_sort(\text{city name}, n1)=$
$1(n1=2\text{-}498)$ $C\_sort(\text{category}, n1)=7(n1=1\text{-}20), C\_sort(\text{category}, n2)=$
$6(n2=21\text{-}80)$ $N(\text{prefecture name})=47, \text{ceil}(N(\text{prefecture name})*$
$\beta(=0.03))=2$ $N(\text{city name})=498, \text{ceil}(N(\text{city name})*0.03)=15$ $N(\text{category})=80, \text{ceil}(N(\text{category})*0.03)=3$ $C(\text{ハート美術館})=1$ (The attribute value ハート美術館 館″ is the top attribute value in the attribute "amenity name" as shown in FIG. 4A.)

The calculation unit 106 uses the above-described information to calculate a cost of each response.

$CConf(\text{amenity name})=0.5*C(\text{ハート美術館})+0.5*$
$(500-C(\text{ハート美術館}))=0.5*1+0.5*499=250$ $CAdd(\text{prefecture name})=$
$\Sigma_{(j=1\rightarrow 2)}C\_sort(\text{prefecture name}, j)=11+11=22$ $CAdd(\text{city name})=\Sigma_{(j=1\rightarrow 15)}C\_sort(\text{city name}, j)=$
$3+1+\ldots+1=17$ $CAdd(\text{category})=\Sigma_{(j=1\rightarrow 3)}C\_sort(\text{category}, j)=$
$7+7+7=21$ From the response costs CConf (amenity name), CAdd (prefecture name), CAdd (city name) and CAdd (category), the selection unit 107 selects, as SYS3, the "response asking the user to input an attribute value in the attribute 'city name'" having the minimum cost. The selection unit 107 acquires a recognition target word from the word storage unit 110 in accordance with the selected response SYS3, and uses this recognition target word to update the speech recognition dictionary stored in the speech recognition dictionary storage unit 102, and also inputs this response SYS3 to the output unit 108. Specifically, the selection unit 107 uses the attribute value in the attribute "city name" as a key to retrieve words from the word storage unit 110, acquires word informations (readings) for this words as recognition target words, and updates the speech recognition dictionary stored in the speech recognition dictionary storage unit 102.

Then, the output unit 108 presents to the user the response SYS3 selected in step S201 (step S202). Further, a speech input USR4 from the user is received by the unshown microphone (step S203). The received input speech USR4 is recognized by the speech recognition unit 101. A recognition candidate which has obtained a score greater than or equal to a certain level as a result of the speech recognition by the speech recognition unit 101 is input to the retrieval unit 103 together with the score.

Then, the retrieval unit 103 uses the recognition candidate and the score obtained in step S203 to update the retrieval condition saved in the dialogue state management unit 105 as shown in FIG. 5A, and uses the updated retrieval condition to retrieve desired data from the data storage unit 104 (step S204). The retrieval unit 103 uses the obtained retrieval result to update the retrieval result saved in the dialogue state management unit 105 as shown in FIG. 5B, and removes unnecessary attribute values from the retrieval condition as shown in FIG. 6.

Then, as the number of retrieved data items obtained in step S204 is five, the dialogue state management unit 105 decides to continue the dialogue (step S205), and the processing returns to step S201.

In step S201, the calculation unit 106 calculates a cost of each response, and the selection unit 107 selects a response having the minimum cost as a response to be presented to the user next. The attribute values in the attributes "amenity name" and "city name" have already been input. Thus, the calculation unit 106 calculates a "cost CConf (amenity name)

of a response ascertaining the truth of one attribute value in the attribute 'amenity name'", a "cost CAdd (prefecture name) of a response asking the user to input an attribute value in the attribute 'prefecture name'", a "cost CConf (city name) of a response ascertaining the truth of one attribute value in the attribute 'city name'", and a "cost CAdd (category) of a response asking the user to input an attribute value in the attribute 'category'".

It is assumed that the following information has been obtained from the retrieval result shown in FIG. 6.

$C\_sort(\text{prefecture name},1)=3, C\_sort(\text{prefecture name},n1)=1(n1=2,3)$ $C\_sort(\text{category},n1)=2(n1=1,2), C\_sort(\text{category},3)=1$ $N(\text{prefecture name})=3, \text{ceil}(N(\text{prefecture name})*\beta(=0.03))=1$ $N(\text{category})=3, \text{ceil}(N(\text{category})*0.03)=1$ $C(\text{ハート美術館})=1$ $C(OO\ \text{city})=1$ The calculation unit 106 uses the above-described information to calculate a cost of each response.

$CConf(\text{amenity name})=0.5*C(\text{ハート美術館})+0.5*(5-C(\text{ハート美術館}))=0.5*1+0.5*4=2.5$ $CAdd(\text{prefecture name})=\Sigma_{(j=1\to 1)}C\_sort(\text{prefecture name},j)=3$ $CConf(\text{city name})=0.85*C(OO\ \text{city})+0.15*(5-C(OO\ \text{city}))=0.85*1+0.15*4=1.45$ $CAdd(\text{category})=\Sigma_{(j=1\to 1)}C\_sort(\text{category},j)=2$ From the response costs CConf (amenity name), CAdd (prefecture name), CConf (city name) and CAdd (category), the selection unit 107 selects, as SYS5, the "response ascertaining the truth of one attribute value 'OO city' in the attribute 'city name'" having the minimum cost. The selection unit 107 acquires recognition target words from the word storage unit 110 in accordance with the selected response SYS5, and uses this recognition target words to update the speech recognition dictionary stored in the speech recognition dictionary storage unit 102, and also inputs this response SYS5 to the output unit 108. Specifically, the selection unit 107 retrieves words indicating affirmative and negative expressions (e.g., "yes" and "no") from the word storage unit 110, acquires word informations (readings) for these words as recognition target words, and updates the speech recognition dictionary stored in the speech recognition dictionary storage unit 102.

Then, the output unit 108 presents to the user the response SYS5 selected in step S201 (step S202). Further, an input speech USR6 from the user is received by the unshown microphone (step S203). The received input speech USR6 is recognized by the speech recognition unit 101. A recognition candidate which has obtained a score greater than or equal to a certain level as a result of the speech recognition by the speech recognition unit 101 is input to the retrieval unit 103 together with the score. Here, the input speech USR6 has a higher score in the affirmative expression than in the negative expression, and is treated as an affirmative expression the retrieval unit 103.

Then, the retrieval unit 103 uses the recognition candidate obtained in step S203 to update the retrieval condition saved in the dialogue state management unit 105, and uses the updated retrieval condition to retrieve desired data from the data storage unit 104 (step S204). Here, in order to treat the input speech USR6 as an affirmative expression, the retrieval unit 103 maintains the attribute value "OO city" alone as an approved attribute value in the attribute "city name" of the retrieval condition saved in the dialogue state management unit 105, and deletes the attribute values "xO city" and "□O city" other than the approved attribute value. The retrieval unit 103 uses the obtained retrieval result to update the retrieval result saved in the dialogue state management unit 105 as shown in FIG. 8A, and removes the unnecessary attribute values from the retrieval condition as shown in FIG. 8B.

Then, the number of retrieved data items obtained in step S204 is one, but the attribute value in the attribute "amenity name" which can specify data has not been approved, so that the dialogue state management unit 105 decides to continue the dialogue (step S205), and the processing returns to step S201.

In step S201, the calculation unit 106 calculates a cost of each response, and the selection unit 107 selects a response having the minimum cost as a response to be presented to the user next. The attribute values in the attributes "amenity name" and "city name" have already been input. Moreover, the attribute value "OO city" in the attribute "city name" has been approved. Thus, the calculation unit 106 calculates a "cost CConf (amenity name) of a response ascertaining the truth of one attribute value in the attribute 'amenity name'", a "cost CAdd (prefecture name) of a response asking the user to input an attribute value in the attribute 'prefecture name'", and a "cost CAdd (category) of a response asking the user to input an attribute value in the attribute 'category'".

It is assumed that the following information has been obtained from the retrieval result shown in FIG. 8B.

$C\_sort(\text{prefecture name},1)=1$ $C\_sort(\text{category},n1)=1$ $N(\text{prefecture name})=1, \text{ceil}(N(\text{prefecture name})*\beta(=0.03))=1$ $N(\text{category})=1, \text{ceil}(N(\text{category})*0.03)=1$ $C(\text{アート美術館})=1$ The calculation unit 106 uses the above-described information to calculate a cost of each response.

$CConf(\text{amenity name})=0.4*C(\text{アート美術館})+0.6*(1-C(\text{アート美術館}))=0.4*1+0.6*0=0.4$ $CAdd(\text{prefecture name})=\Sigma_{(j=1\to 1)}C\_sort(\text{prefecture name},j)=1$ $CAdd(\text{category})=\Sigma_{(j=1\to 1)}C\_sort(\text{category},j)=1$ From the response costs CConf (amenity name), CAdd (prefecture name) and CAdd (category), the selection unit 107 selects, as SYS7, the "response ascertaining the truth of one attribute value 'アート美術館' in the attribute 'amenity name'" having the minimum cost. The selection unit 107 acquires a recognition target word from the word storage unit 110 in accordance with the selected response SYS7, and uses this recognition target word to update the speech recognition dictionary stored in the speech recognition dictionary storage unit 102, and also inputs this response SYS7 to the output unit 108. Specifically, the selection unit 107 retrieves words indicating affirmative and negative expressions (e.g., "yes" and "no") from the word storage unit 110, acquires word informations (readings) for these words as recognition target words, and updates the speech recognition dictionary stored in the speech recognition dictionary storage unit 102.

Then, the output unit 108 presents to the user the response SYS7 selected in step S201 (step S202). Further, an input speech USR8 from the user is received by the unshown microphone (step S203). The received input speech USR8 is recognized by the speech recognition unit 101. A recognition candidate which has obtained a score greater than or equal to a certain level as a result of the speech recognition by the speech recognition unit 101 is input to the retrieval unit 103 together with the score. Here, the input speech USR8 has a higher score in the affirmative expression than in the negative expression, and is treated as an affirmative expression the retrieval unit 103.

Then, the retrieval unit 103 uses the recognition candidate obtained in step S203 to update the retrieval condition saved in the dialogue state management unit 105, and uses the updated retrieval condition to retrieve desired data from the data storage unit 104 (step S204). Here, in order to treat the input speech USR8 as an affirmative expression, the retrieval unit 103 maintains the attribute value "アート美術館" alone as an approved attribute value in the attribute "amenity name" of the retrieval condition saved in the dialogue state management unit 105 as shown in FIG. 9A. The retrieval unit 103 uses the obtained retrieval result to update the retrieval result saved in the dialogue state management unit 105 as shown in FIG. 9B.

Then, the number of retrieved data items obtained in step S204 is one, and the attribute value "アート美術 館" in the attribute "amenity name" which can specify data has been approved, so that the dialogue state management unit 105 decides to end the dialogue (step S205), and inputs the data desired by the user "art gallery 'アート美術館' situated in OO city, A prefecture" to the output unit 108. The output unit 108 presents to the user the desired data "art gallery 'アート美術館' situated in OO city, A prefecture" from the dialogue state management unit 105, and the processing ends.

As described above, the spoken dialogue apparatus according to the present embodiment calculates, for each attribute, (A) a cost of the first response asking the user to input an attribute value concerning an attribute which has not yet been input and (B) a cost of the second response ascertaining the truth of one attribute value in an already input attribute, and the apparatus selects and presents to the user a response having the minimum cost. Consequently, according to the spoken dialogue apparatus in the present embodiment, a response whereby a decrease in the number of retrieved data items can be most expected is presented to the user, so that a decrease in the degree of satisfaction of the user can be reduced.

Second Embodiment

A spoken dialogue apparatus according to a second embodiment of the present invention is partly different from the above-described spoken dialogue apparatus according to the first embodiment in the operations of a calculation unit 106. The difference between the spoken dialogue apparatus according to the present embodiment and the spoken dialogue apparatus according to the first embodiment will be mainly described below.

While the cost CConf(ArgX) calculated by the calculation unit 106 indicates the cost of the response ascertaining the truth of the top attribute value ArgX_top in the first embodiment described above, the present embodiment is not limited to this. That is, the calculation unit 106 may also calculate costs of responses ascertaining the truth of attribute values other than the top attribute value. In the following description, the cost of a response ascertaining the truth of a j-th attribute value is represented by CConf(ArgX, j). For example, CConf (ArgX) in the first embodiment described above can be represented by CConf(ArgX, 1). In Expression 2, the cost CConf (ArgX, j) can be calculated by replacing C(ArgX_top) with the number of data items having the j-th attribute value and replacing p with the degree of reliability as a speech input of this attribute value.

In the present embodiment, if there are more kinds of attribute values targeted by the calculation unit 106 to calculate the cost CConf(ArgX, j) concerning an attribute ArgX, it is easier to obtain a response whereby a decrease in the number of retrieved data items can be most expected. However, the increase in the kind of attribute value targeted for calculation increases the amount of calculation in the calculation unit 106. Therefore, it is necessary to determine attribute values targeted for calculation in accordance with the amount of calculation permitted in the calculation unit 106. In addition, how to determine an attribute value for easily obtaining a response whereby a decrease in the number of retrieved data items can be most expected in policies I and II shown below is described.

I. Higher attribute values are preferentially targeted for cost calculation.

A higher attribute value is high in the degree of reliability as the input speech of the user, and can therefore be expected to be approved by the user. If not approved, such an attribute value is close to the actual speech input and does not tend to elicit suspicion in the user. That is, the flow of a dialogue is natural. On the other hand, a response ascertaining an attribute value with a low degree of reliability is more likely to be an unexpected response to the user, and tends to elicit suspicion in the user and may therefore decrease the degree of satisfaction.

II. Attribute values having larger numbers of retrieved data items are preferentially targeted for cost calculation.

The cost of an attribute value having a large number of retrieved data items is lower than in Expression 2 if the degree of reliability of this attribute value as a speech input of the user is lower.

As described above, in the spoken dialogue apparatus according to the present embodiment, the target for the calculation of a response ascertaining the truth of one attribute value in a certain attribute is not limited to the top attribute value in this attribute but is extended to lower attribute values. Consequently, according to the spoken dialogue apparatus in the present embodiment, it is easier to obtain a response whereby a decrease in the number of retrieved data items can be most expected.

Third Embodiment

A spoken dialogue apparatus according to a third embodiment of the present invention is partly different from the above-described spoken dialogue apparatus according to the first embodiment in the operations of a retrieval unit 103, a calculation unit 106 and a selection unit 107. The difference between the spoken dialogue apparatus according to the present embodiment and the spoken dialogue apparatus according to the first embodiment will be mainly described below.

In the first embodiment described above, the calculation unit 106 calculates two kinds of costs: (A) the cost CAdd (ArgX) of the first response asking the user to input the attribute value concerning the attribute ArgX which has not yet been input and (B) the cost CConf(ArgY) of the second response ascertaining the truth of one attribute value in the already input attribute ArgY. In the present embodiment, the calculation unit 106 further calculates (C) a cost CConf2 (ArgX) of a third response ascertaining the truth of one attribute value in the attribute ArgX which has not yet been input. The third response is similar to the second response in that it ascertains the truth of an attribute value, so that the cost CConf2(ArgX) of the third response can be calculated by the following expression similarly to the cost CConf(ArgY) of the second response.

$$CConf2(ArgX)=p*C(ArgX\_top)+(1-p)* (TOTAL-C(ArgX\_top)) \quad (3)$$

However, since the attribute value in the attribute ArgX is not input, a top attribute value ArgX_top and the degree of reliability p of this top attribute value ArgX_top as a speech input are indefinite. Thus, the calculation unit 106 uses a retrieval condition concerning the already input attribute ArgY to derive ArgX_top' and p' substituted for ArgX_top and p.

The attribute value ArgX_top' substituted for the top attribute value ArgX_top is derived from the attribute value in the attribute ArgX of the data to which the top attribute value ArgY_top in the already input attribute ArgY is associated with.

For example, when receiving the above-described retrieval condition shown in FIG. 4A and retrieval condition shown in FIG. 4B from the dialogue state management unit 105, the calculation unit 106 extracts, from the retrieval conditions, data associated with the top attribute value "ハート美術館" (ArgY_top) of the already input attribute "amenity name" (ArgY). As the data to be extracted is only data of ID=3, a prefecture name "C prefecture", a city name "xO city" and a category "art gallery" are derived as the attribute values ArgX_top' on the basis of the attribute value associated with the relevant data.

In addition, when attribute values concerning a plurality of attributes have already been input or when there are a plurality of data associated with ArgY_top, a plurality of kinds of candidates for the attribute values ArgX_top' might appear. In such a case, the calculation unit 106 may limit the attribute values ArgX_top' to be derived to a predetermined number.

The value p' substituted for the degree of reliability p is derived by the following expression.

$$p'=p\_ArgY\_top/N(ArgX\_top'|ArgY\_top) \quad (4)$$

where p_ArgY_top indicates the degree of reliability of the top attribute value ArgY_top in the attribute ArgY as a speech input, and N(ArgX_top'|ArgY_top) is the number of kinds of ArgX_top' derived from ArgY_top. That is, Expression 4 assumes that each attribute value ArgX_top' equally emerges because the degree of the dependence of each attribute value ArgX_top' on the attribute value ArgY_top is unknown. The cost CConf2(ArgX) tends to be lower when the degree of the dependence of the attribute value ArgX_top' on the attribute value ArgY_top is high, namely, when the attribute value ArgX_top' is nearly decided if the attribute value ArgY_top is decided.

If a response which has most recently been presented from an output unit 108 is (C) the third response ascertaining the truth of one attribute value in an attribute which has not yet been input, the retrieval unit 103 treats a recognition candidate from a speech recognition unit 101 as an approval or denial in accordance with the score. Specifically, when the recognition candidate from the speech recognition unit 101 indicates an approval, the retrieval unit 103 adds the above-mentioned attribute value as an approved attribute value to update the retrieval conditions saved in the dialogue state management unit 105. On the other hand, when the recognition candidate from the speech recognition unit 101 indicates a denial, the retrieval unit 103 denies the above-mentioned attribute value to update the retrieval conditions saved in the dialogue state management unit 105. In addition, in this case, the above-mentioned attribute value is treated as an attribute which has not yet been input in the calculation unit 106.

The update of the retrieval condition by the retrieval unit 103 is concretely described below taking an example of the case where a response presented from the output unit 108 is (C) the third response ascertaining the truth of one attribute value "C prefecture" in the attribute "prefecture name" which has not yet been input. When the recognition candidate from the speech recognition unit 101 indicates an approval, the retrieval unit 103 adds the above-mentioned attribute value as an approved attribute value to update the retrieval conditions saved in the dialogue state management unit 105 as shown in FIG. 11A. On the other hand, when the recognition candidate from the speech recognition unit 101 indicates a denial, the retrieval unit 103 denies the above-mentioned attribute value to update the retrieval conditions saved in the dialogue state management unit 105 as shown in FIG. 11B.

When selecting (C) the third response ascertaining the truth of one attribute value in an attribute which has not yet been input, the selection unit 107 acquires information on words indicating an approval and a denial from the word storage unit 110 as recognition target words as in the case of selecting the (B) second response ascertaining the truth of one attribute value in an already input attribute.

As described above, the spoken dialogue apparatus according to the present embodiment further calculates a cost of a response ascertaining the truth of one attribute value in an attribute which has not yet been input. Consequently, according to the spoken dialogue apparatus in the present embodiment, it is easier to obtain a response whereby a decrease in the number of retrieved data items can be most expected.

In addition, in the present embodiment, the top attribute value ArgX_top' of the uninput attribute ArgX is derived on the basis of the top attribute value ArgY_top of the already input attribute ArgY. However, an attribute value ArgX_j' other than the top attribute value of the attribute ArgX may be derived on the basis of a corresponding attribute value ArgY_j in the attribute ArgY. Expressions 3 and 4 mentioned above can also be used in such a case.

Fourth Embodiment

A spoken dialogue apparatus according to a fourth embodiment of the present invention is partly different from the above-described spoken dialogue apparatus according to the first embodiment in the operations of a retrieval unit 103 and a dialogue state management unit 105. The difference between the spoken dialogue apparatus according to the present embodiment and the spoken dialogue apparatus according to the first embodiment will be mainly described below.

In the present embodiment, the dialogue state management unit 105 does not end a dialogue even if a retrieval result is null, and causes the retrieval unit 103 to modify a retrieval condition. When determining by the contents held in the dialogue state management unit 105 that the retrieval result is null, the retrieval unit 103 nullifies the retrieval conditions for all the attributes other than the approved attribute value. Maintaining the approved attribute value as a retrieval condition leads to a smaller number of attribute values to be received in each attribute than in the case of nullifying the retrieval conditions for all the attributes, so that the number of recognition target words in a speech recognition unit 101 decreases. Consequently, the accuracy of speech recognition in the speech recognition unit 101 is improved when the user again inputs a speech.

In addition, if the number of times that retrieval result is null becomes greater than or equal to a predetermined time after the retrieval condition has been once modified, the retrieval unit 103 may nullify the retrieval conditions for all the attributes including the approved attribute value. If the number of times that the retrieval result is null further becomes greater than or equal to the predetermined time, the dialogue state management unit 105 may input a retrieval result to an output unit 108 to end the dialogue.

Figure 12:
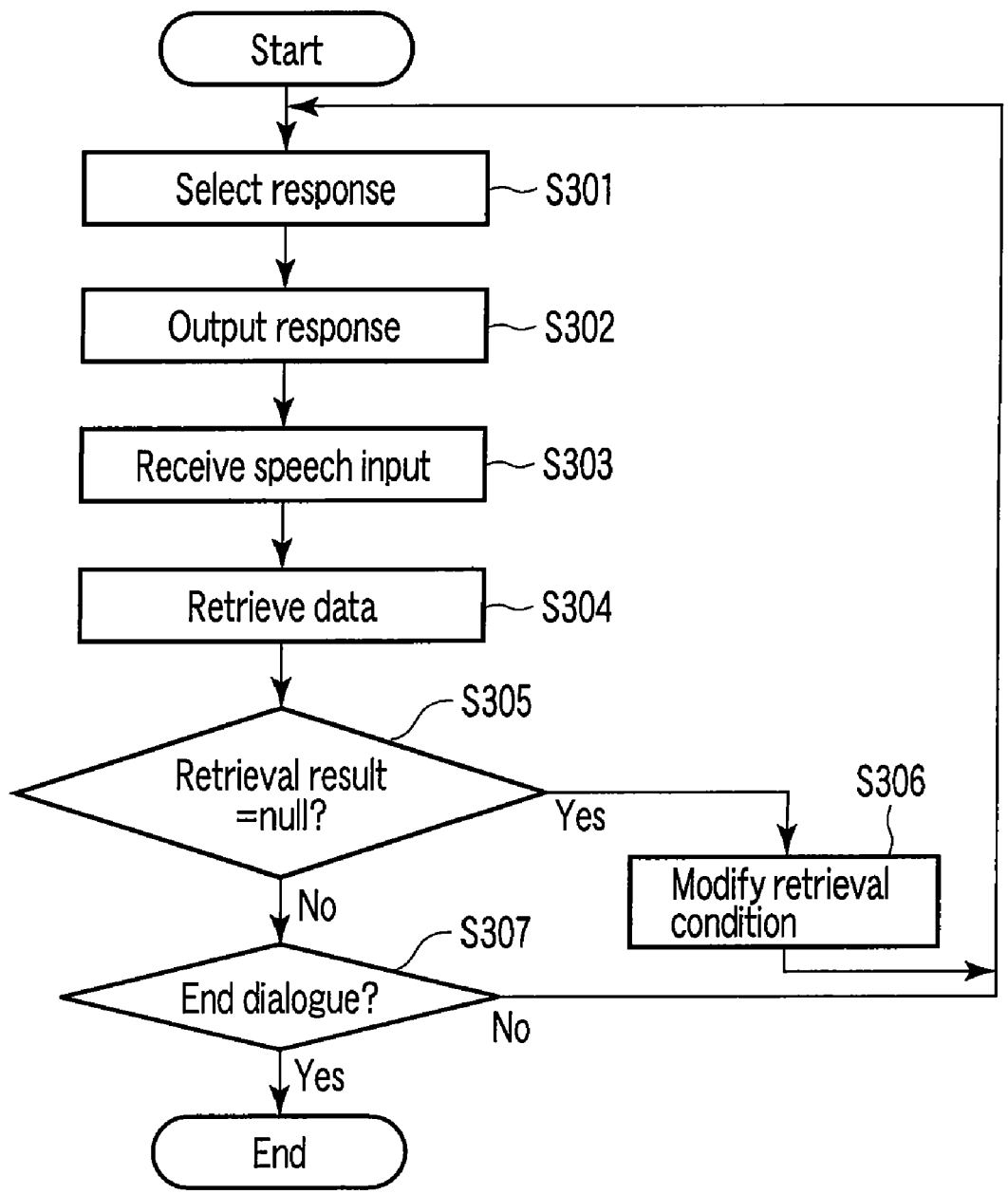
FIG. 12 is a flowchart showing operations of a spoken dialogue apparatus according to a fourth embodiment.

One example of the operations of the spoken dialogue apparatus according to the present embodiment is described below using a flowchart shown in FIG. 12.

When a dialogue between the user and the spoken dialogue apparatus according to the present embodiment is started, processing moves to step S301. In step S301, a calculation unit 106 calculates a cost of each response, and a selection unit 107 selects a response having the minimum cost as a response to be presented to the user next. The selection unit 107 acquires a recognition target word from the word storage unit 110 in accordance with the selected response, and uses this recognition target word to update the speech recognition dictionary stored in the speech recognition dictionary storage unit 102, and also inputs this response to the output unit 108.

Then, the output unit 108 presents to the user the response selected in step S301 (step S302). Further, an input speech of the user corresponding to the response presented in step S302 is received by, for example, an unshown microphone (step S303). The received input speech is recognized by the speech recognition unit 101. A recognition candidate which has obtained a score greater than or equal to a certain level as a result of the speech recognition by the speech recognition unit 101 is input to the retrieval unit 103 together with the score.

Then, the retrieval unit 103 uses the recognition candidate and the score obtained in step S303 to update the retrieval condition saved in the dialogue state management unit 105, and uses the updated retrieval condition to retrieve desired data from the data storage unit 104 (step S304). The retrieval unit 103 uses the obtained retrieval result to update the retrieval result saved in the dialogue state management unit 105.

Then, the dialogue state management unit 105 determines whether the retrieval result obtained in step S304 is null (step S305). The processing moves to step S306 if the retrieval result is null, or the processing moves to step S307 if not.

Then, the retrieval unit 103 nullifies the retrieval conditions saved in the dialogue state management unit 105 for all the attributes other than the approved attribute value (step S306). In addition, as described above, if the number of times that retrieval result is null becomes greater than or equal to a predetermined time after the retrieval condition has been once modified, the retrieval unit 103 may nullify the retrieval conditions for all the attributes including the approved attribute value. If the number of times that the retrieval result is null further becomes greater than or equal to the predetermined time, the dialogue state management unit 105 may input a retrieval result to the output unit 108 to end the dialogue.

In step S307, the dialogue state management unit 105 decides whether to end or continue the dialogue on the basis of the retrieval result obtained in step S304. When it is decided in step S307 that the dialogue is continued, the processing returns to step S301. On the other hand, when it is decided in step S307 that the dialogue is ended, the retrieval result is presented to the user from the output unit 108, and the processing ends.

As described above, in the spoken dialogue apparatus according to the present embodiment, the retrieval condition is modified when the retrieval result is null. Consequently, according to the spoken dialogue apparatus in the present embodiment, it is possible to restart a dialogue even when a speech input of the user contradicts the contents stored in the data storage unit.

Fifth Embodiment

A spoken dialogue apparatus according to a fifth embodiment of the present invention is partly different from the above-described spoken dialogue apparatus according to the first embodiment in the operations of a speech recognition unit 101, a retrieval unit 103 and a dialogue state management unit 105. The difference between the spoken dialogue apparatus according to the present embodiment and the spoken dialogue apparatus according to the first embodiment will be mainly described below.

In the present embodiment, the speech recognition unit 101 outputs a speech input of the user in addition to a recognition candidate and a score of the recognition candidate. In addition, the speech input has only to be in a form which can be reevaluated by the speech recognition unit 101 as described later, and may be in the form of, for example, a characteristic parameter obtainable by analyzing a speech.

When one attribute value concerning a certain attribute has been approved, the retrieval unit 103 uses this approved attribute value to perform the above-described narrowed retrieval processing, and then inputs the above-mentioned input speech to the speech recognition unit 101 for each unapproved attribute. The speech recognition unit 101 reevaluates the input speech on the basis of recognition target words corresponding to the current retrieval condition, and returns the recognition candidate and the score to the retrieval unit 103. In general, the accuracy of speech recognition is higher with fewer recognition target words, and the reevaluated recognition candidate and score are higher in the degree of reliability than the previous recognition candidate and score.

The retrieval unit 103 uses the reevaluated recognition candidate and score to update the retrieval condition saved in the dialogue state management unit 105, performs narrowed retrieval of desired data from a data storage unit 104, and uses this retrieval result to update the retrieval result and retrieval condition saved in the dialogue state management unit 105.

Figure 14B:
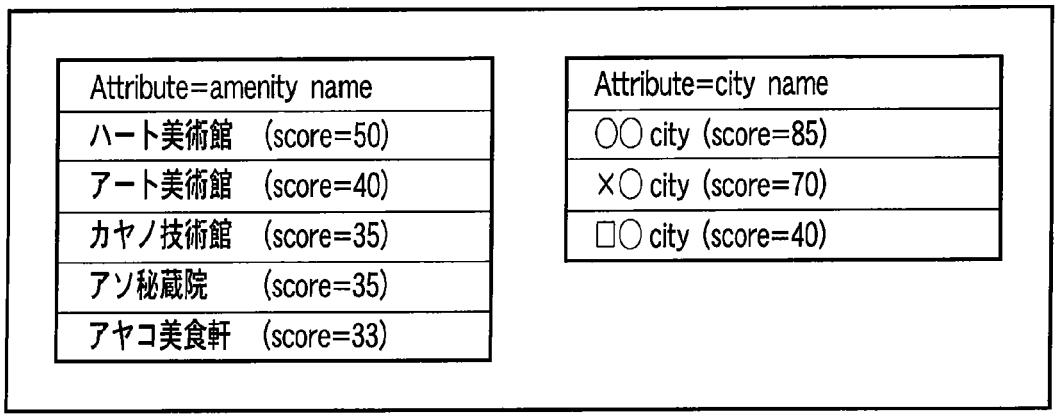
FIG. 14B is a diagram showing retrieval conditions saved in the dialogue state management unit of the spoken dialogue apparatus according to the fifth embodiment.
Figure 14C:
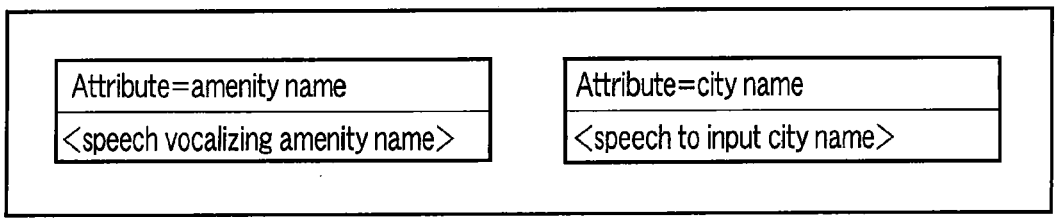
FIG. 14C is a diagram showing input speeches saved in the dialogue state management unit of the spoken dialogue apparatus according to the fifth embodiment.

The input speech is saved in the dialogue state management unit 105 for each attribute. That is, the dialogue state management unit 105 manages the retrieval results, retrieval conditions and speech inputs, as shown in FIGS. 14A, 14B and 14C, respectively. In addition, the speech inputs may be saved in some other storage area instead of the dialogue state management unit 105. The input speeches may be managed in any manner as long as the retrieval unit 103 can access an input speech corresponding to an attribute.

One example of the operations of the spoken dialogue apparatus in FIG. 1 is described below using a flowchart shown in FIG. 12.

When a dialogue between the user and the spoken dialogue apparatus according to the present embodiment is started, processing moves to step S401. In step S401, a calculation unit 106 calculates a cost of each response, and the selection unit 107 selects a response having the minimum cost as a response to be presented to the user next. The selection unit 107 acquires recognition target words from a word storage unit 110 in accordance with the selected response, and uses this recognition target words to update the speech recognition dictionary stored in a speech recognition dictionary storage unit 102, and also inputs this response to an output unit 108.

Then, the output unit 108 presents to the user the response selected in step S401 (step S402). Further, an input speech of the user corresponding to the response presented in step S402 is received by, for example, an unshown microphone (step S403). The received input speech is recognized by the speech recognition unit 101. A recognition candidate which has obtained a score greater than or equal to a certain level as a result of the speech recognition by the speech recognition unit 101 is input to the retrieval unit 103 together with the score. The input speech of the user is saved in the dialogue state management unit 105, and the processing moves to step S404.

In step S404, the retrieval unit 103 uses the recognition candidate and the score from the speech recognition unit 101 to update the retrieval condition saved in the dialogue state management unit 105, and uses the updated retrieval condition to retrieve desired data from the data storage unit 104. The retrieval unit 103 uses the obtained retrieval result to update the retrieval result saved in the dialogue state management unit 105.

Then, the retrieval unit 103 determines whether the input speech received in step S403 is the approval of a certain attribute value (step S405). The processing moves to step S406 if the input speech received in step S403 is the approval of the attribute value, or the processing moves to step S407 if not.

In step S406, the speech recognition unit 101 reevaluates the input speech saved in the dialogue state management unit 105 for each attribute with an unapproved attribute value and thus inputs a new recognition candidate and score to the retrieval unit 103, and the processing moves to step S404. In addition, in step S406, the recognition target words in the speech recognition unit 101 only cover the attribute values included in the retrieval condition for each attribute.

In step S407, the dialogue state management unit 105 decides whether to end or continue the dialogue on the basis of the retrieval result obtained in step S404 (step S407). When it is decided in step S407 that the dialogue is continued, the processing returns to step S401. On the other hand, when it is decided in step S407 that the dialogue is ended, the retrieval result is presented to the user from the output unit 108, and the processing ends.

As described above, in the spoken dialogue apparatus according to the present embodiment, the previous input speeches of the user are reevaluated whenever an attribute value is approved. Consequently, according to the spoken dialogue apparatus in the present embodiment, an input speech can be reevaluated with a decreased number of recognition target words, so that retrieval errors due to the accuracy of speech recognition can be reduced.

Sixth Embodiment

A spoken dialogue apparatus according to a sixth embodiment of the present invention is partly different from the above-described spoken dialogue apparatus according to the fifth embodiment in the configuration of a word storage unit 110. The difference between the spoken dialogue apparatus according to the present embodiment and the spoken dialogue apparatus according to the first embodiment will be mainly described below.

Figure 15:
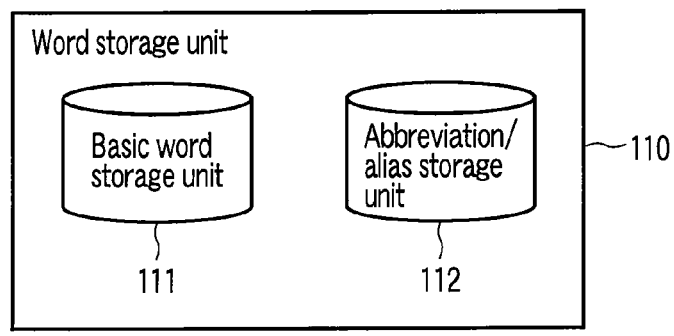
FIG. 15 is a block diagram showing a word storage unit of a spoken dialogue apparatus according to a sixth embodiment.

In the present embodiment, the word storage unit 110 is divided into a basic word storage unit 111 and an alias/abbreviation storage unit 112, as shown in FIG. 15.

The basic word storage unit 111 stores general and principal words indicating attribute values stored in a data storage unit 104 and indicating affirmative and negative expressions by the user, in association with word information (reading) necessary for the speech recognition of the words.

The alias/abbreviation storage unit 112 stores, among the words indicating attribute values stored in the data storage unit 104, words corresponding to aliases/abbreviations which are not stored in the basic word storage unit 111, in association with word information (reading) necessary for the speech recognition of the words.

In the present embodiment, recognition target words for a speech recognition unit 101 are only acquired from the basic word storage unit 111 in the case of initial recognition. If the number of recognition target words for the speech recognition unit 101 decreases to a predetermined number or less in a subsequent reevaluation, recognition target words are acquired not only from the basic word storage unit 111 but also from the alias/abbreviation storage unit 112.

The technical significance of the use of the word storage unit 110 divided into the basic word storage unit 111 and the alias/abbreviation storage unit 112 is described below.

For example, the user may not know, for example, the official name of an attribute value to be input, but may know its alias or abbreviation. In such a case, the speech recognition unit 101 might not be able to correctly recognize a speech input of the user simply by the words stored in the basic word storage unit 111. On the other hand, if the words stored in the alias/abbreviation storage unit 112 are used from the beginning, recognition target words increase in the speech recognition unit 101, and the accuracy of speech recognition might rather decrease.

Therefore, in the present embodiment, the basic word storage unit 111 alone is used at an initial stage where the number of recognition target words is great in order to reduce the number of words, and the alias/abbreviation storage unit 112 is used together after the number of recognition target words has decreased to the predetermined number or less. That is, in the spoken dialogue apparatus according to the present embodiment, the decrease of the accuracy of speech recognition in the speech recognition unit 101 is reduced at the initial stage, and words corresponding to aliases/abbreviations are added to the recognition target words after the number of recognition target words has decreased to the predetermined number or less, thereby increasing the possibility that a correct recognition candidate can be obtained.

As described above, in the spoken dialogue apparatus according to the present embodiment, the word storage unit used to acquire recognition target words in the speech recognition unit is divided into the basic word storage unit and the alias/abbreviation storage unit, which are suitably used in accordance with the number of recognition target words in the speech recognition unit. Consequently, according to the spoken dialogue apparatus in the present embodiment, the decrease of the accuracy of speech recognition in the speech recognition unit is reduced, and at the same time, a decrease in the degree of satisfaction of the user can be reduced even when the user only knows the alias or abbreviation of an attribute value to be input.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, in the spoken dialogue apparatus according to each of the above-described embodiments, when desired data is retrieved, the desired data is presented to the user and a dialogue is then ended, but the function performable by the present invention is not limited to this. For example, the present invention may perform another function using a retrieval result after a retrieval has ended. In the case where the present invention is applied to an information processing terminal, detailed information on a retrieval result may be presented. Further, in the case where the present invention is applied to a car navigation system, a destination may be set on the basis of a retrieval result. Still further, in the case where the present invention performs a function other than the function of retrieving desired data, a dialogue with the user may be continued.

Moreover, it goes without saying that the present invention can be also carried out when various modifications are made without departing from the spirit of the invention.

What is claimed is:

1. A spoken dialogue apparatus which retrieves desired data from a data storage unit storing data in association with attribute values concerning a plurality of attributes of the data, comprising:
   a speech recognition unit configured to perform speech recognition of an input speech of a user for a presented response from the apparatus to obtain a recognition candidate in one attribute from recognition target words corresponding to the presented response;
   a retrieval unit configured to update a retrieval condition by use of the recognition candidate and retrieve data corresponding to the retrieval condition from the data storage unit to output as a retrieval result;
   a calculation unit configured to calculate estimated numbers of data as costs concerning a first response and a second response based on the retrieval condition and the retrieval result, the data being included in retrieval result after narrowed retrieval performed in accordance with an input speech corresponding to the first response asking the user to input an attribute value of an attribute which has not been input and corresponding to the second response ascertaining the truth of an attribute value of an attribute which has been input; and
   a selection unit configured to select a response having the lowest cost and present the response to the user,
   wherein the retrieval unit (a) updates the retrieval condition by adding the recognition candidate to the retrieval condition when the presented response corresponds to the first response, (b) updates the retrieval condition by maintaining an approved attribute value in the retrieval condition and deleting other attribute value of the attribute related to the presented response from the retrieval condition when the presented response corresponds to the second response and the recognition candidate indicates approval, and (c) updates the retrieval condition by deleting a denied attribute value form the retrieval condition and maintaining other attribute value of the attribute related to the presented response in the retrieval condition when the presented response corresponds to the second response and the recognition candidate indicates denial.

2. The apparatus according to claim 1, wherein the second response ascertains the truth of an attribute value having a highest score provided by the speech recognition unit regarding the attribute related to the presented response.

3. The apparatus according to claim 1, wherein the calculation unit further calculates a cost of a third response ascertaining the truth of an attribute value of the attribute which has not been input.

4. The apparatus according to claim 1, wherein the retrieval unit modifies the retrieval condition by deleting, from the retrieval condition, all the attribute values but an attribute value previously ascertained to be true with regard to the second response when the retrieval result is null.

5. The apparatus according to claim 1, wherein the speech recognition unit again performs speech recognition of a previous input speech in order to obtain a recognition candidate concerning a first unapproved attribute from the recognition target words when an input speech indicating that an attribute value of a second unapproved attribute is true with regard to the second response is obtained, wherein the first unapproved attribute is different from the second unapproved attribute.

6. The apparatus according to claim 5, wherein an alias of the attribute value and an abbreviation of the attribute value are added to the recognition target words to increase a number of the recognition target words when the number of the recognition target words is less than or equal to a predetermined number.

7. A spoken dialogue method which retrieves desired data from a data storage unit storing data in association with attribute values concerning a plurality of attributes of the data, comprising:
   performing speech recognition of an input speech of a user for a presented response by a spoken dialogue apparatus to obtain a recognition candidate in one attribute from recognition target words corresponding to the presented response, by a speech recognition unit;
   updating a retrieval condition by use of a recognition candidate and retrieving data corresponding to the retrieval condition from the data storage unit to output as a retrieval result, by a retrieval unit;
   calculating estimated numbers of data as costs concerning a first response and a second response based on the retrieval condition and the retrieval result, the data being included in retrieval result after narrowed retrieval performed in accordance with an input speech corresponding to the first response asking the user to input an attribute value of an attribute which has not been input and corresponding to the second response ascertaining the truth of an attribute value of an attribute which has been input, by a calculation unit; and
   selecting a response having the lowest cost and presenting the response to the user, by a selection unit,
   wherein the retrieval unit (a) updates the retrieval condition by adding the recognition candidate to the retrieval condition when the presented response corresponds to the first response, (b) updates the retrieval condition by maintaining an approved attribute value in the retrieval condition and deleting other attribute value of the attribute related to the presented response from the retrieval condition when the presented response corresponds to the second response and the recognition candidate indicates approval, and (c) updates the retrieval condition by deleting a denied attribute value form the retrieval condition and maintaining other attribute value of the attribute related to the presented response in the retrieval condition when the presented response corresponds to the second response and the recognition candidate indicates denial.

8. The method according to claim 7, wherein the second response ascertains the truth of an attribute value having a highest score provided by the speech recognition unit regarding the attribute related to the presented response.

9. The method according to claim 7, wherein the calculation unit further calculates a cost of a third response ascertaining the truth of an attribute value of the attribute which has not been input.

10. The method according to claim 7, wherein the retrieval unit modifies the retrieval condition by deleting, from the retrieval condition, all the attribute values but an attribute value previously ascertained to be true with regard to the second response when the retrieval result is null.

11. The method according to claim 7, wherein the speech recognition unit again performs speech recognition of a previous input speech in order to obtain a recognition candidate concerning a first unapproved attribute from the recognition target words when an input speech indicating that an attribute value of a second unapproved attribute is true with regard to the second response is obtained, wherein the first unapproved attribute is different from the second unapproved attribute.

12. The method according to claim 11, wherein an alias of the attribute value and an abbreviation of the attribute value are added to the recognition target words to increase a number of the recognition target words when the number of the recognition target words is less than or equal to a predetermined number.

* * * * *